455-609 AU 233 EX Examine

FIP8106 OR 3,465,156

Sept. 2, 1969 C. J. PETERS 3,465,156

461.347

LASER COMMUNICATIONS SYSTEM EMPLOYING
NARROW BAND NOISE CANCELLATION
Filed June 4, 1965

INVENTOR
CHARLES J. PETERS

BY Stanley M. Schwingin

ATTORNEY

United States Patent Office 3,465,156
Patented Sept. 2, 1969

3,465,156

LASER COMMUNICATIONS SYSTEM EMPLOYING NARROW BAND NOISE CANCELLATION

Charles J. Peters, Wayland, Mass., assignor to Sylvania Electric Products, Inc., a corporation of Delaware Filed June 4, 1965, Ser. No. 461,347
Int. Cl. H04b 9/00
U.S. Cl. 250—199 5 Claims This invention relates to communications systems and more particularly to laser communications systems.

Figures 1, 2:
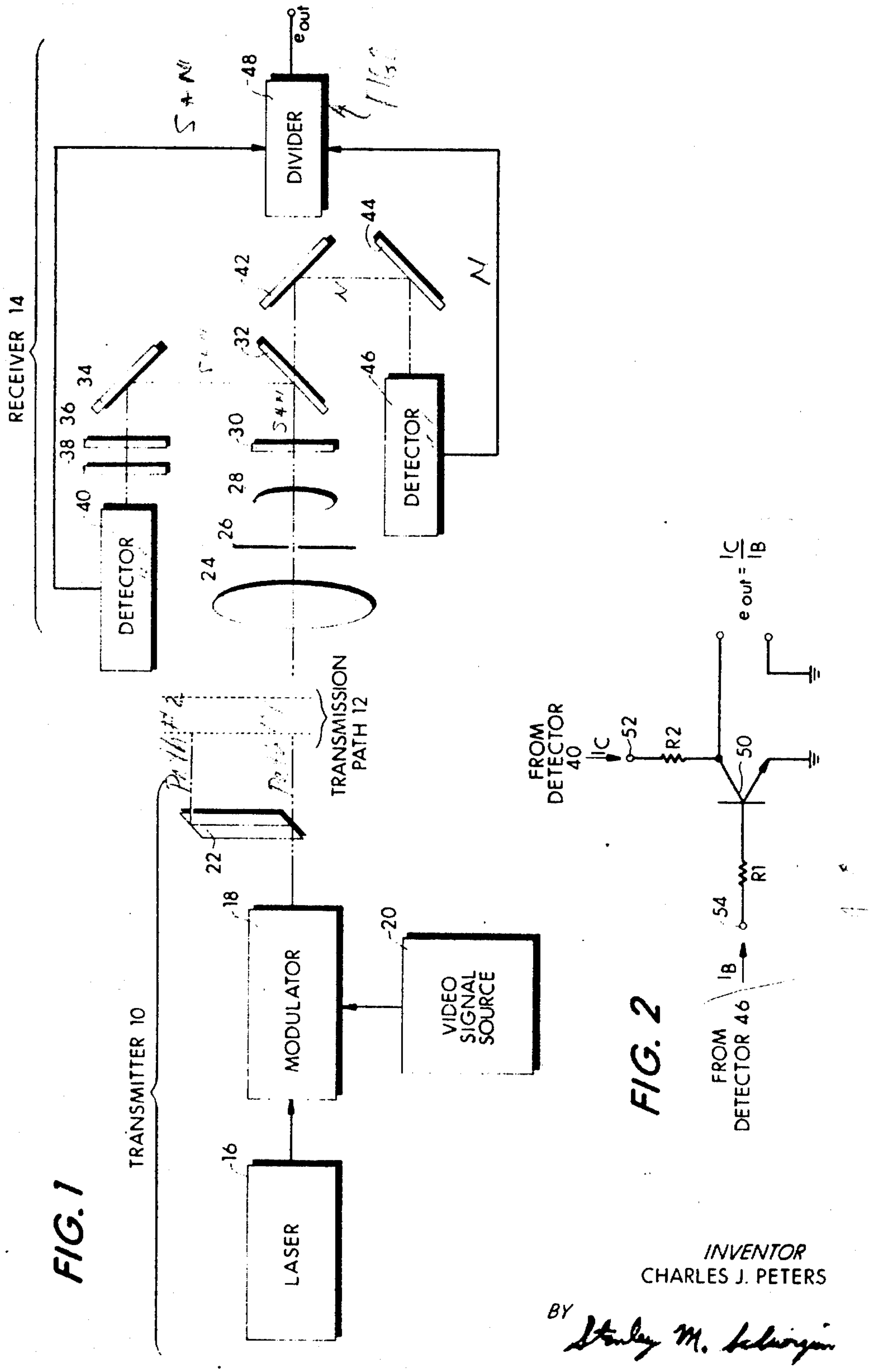

In laser communications links, as with many microwave systems, atmospheric conditions can drastically affect the characteristics of the transmission path causing serious degradation of the received signal. For example, storms, mist and air turbulence can cause wide variations in the amplitude of a received signal. In addition, noise generated by the laser itself degrades the transmitted signal. Various correctional schemes that have heretofore been suggested generally require wide bandwidth circuitry to compensate for signal variations due to noise. Such wide bandwidth circuitry is unnecessarily complex and expensive and it would be advantageous to provide noise reduction or noise cancellation with narrow band equipment.

It is, therefore, an object of the invention to provide an improved laser communications link. Another object of the present invention is to provide a noise cancellation technique employing narrow band circuitry.

Another object of the invention is to provide a laser communications link employing space diversity.

A further object of the invention is to provide a noise cancellation technique employing a simple narrow band divider circuit.

In accordance with the present invention, the transmitted laser beam is split into two paths to provide space diversity, and the received light is also split into two beams, one containing only atmospheric and laser noise and the other a video signal modulated by the noise. These beams are converted to electrical signals which are then combined in a simple narrow band divider circuit to remove the noise and produce only the desired video signal.

The invention will be more fully understood from the following detailed description, taken in conjunction with the accompanying drawings, in which:

FIG. 1 is a diagrammatic representation of a laser communications link according to the invention; and FIG. 2 is a schematic representation of a divider circuit useful in the present invention.

Referring to FIG. 1 there is shown a laser communications link including a transmitter 10, a transmission path 12 and a receiver 14. The transmitter consists of a laser 16, a polarization modulator 18, energized from a video signal source 20, for impressing intelligence upon the laser beam, and a beam splitter 22, which may be a glass parallelepiped as illustrated, or, alternatively, a pair of mirrors or prisms. The beam splitter functions to divide the laser beam into two beams which are convergent so as to become substantially coincident for ranges greater than say 250 feet. The laser beam near the transmitter is narrow, typically ⅛ inch in diameter, and can be easily blocked by objects such as raindrops, snow, insects, or dirt. The beam diverges as it progresses from the transmitter, and at distances greater than about 250 feet is several inches in diameter. It is clear that objects of the type enumerated above will not now completely block the relatively wide beam. The use of a pair of transmitted beams provides space diversity wherein objects such as raindrops, insects and the like near the transmitter where the beams are relatively narrow will not cause serious degradation of the received signal since the probability is very small that raindrops or other bodies will completely block both paths simultaneously. A body intersecting a single path reduces the received power by three db, which can be easily compensated by the receiver circuitry. Thus, the provision of space diversity allows a usable amount of light to reach the receiver.

The received beam contains noise generated by the laser itself as well as noise caused by atmospheric conditions such as storms and air turbulence. The effect of such noise is to amplitude-modulate the light beam, causing serious degradation of the received signal. The cancellation of such noise is accomplished, according to the invention, in the following manner.

The received beam, which is actually composed of the now coincident transmitted beams, is collected by a large diameter lens 24. A field stop 26 is placed at the image plane of lens 24 to exclude background light, and received light passing through this field stop is collimated by lens 28 and passed through a narrow band optical filter 30. Filter 30 is narrow band in the optical sense but is sufficiently broadband to pass the received video signal. The received light beam is then passed through a beam splitting mirror 32 which reflects a major portion of the received beam via a mirror 34, quarter wave plate 36 and linear polarizer 38 to a photodetector 40, such as a photomultiplier tube. The linear polarizer is operative in response to the modulated light to produce light whose intensity varies according to the video signal. The output signal from photodetector 40 contains the video signal modulated by the noise caused by the atmosphere and the laser.

The portion of the received light beam which passes through mirror 32 is directed via mirrors 42 and 44 to a second photodetector 46. The output of this detector contains only noise signals since no linear polarizer is employed to detect the video information. The output signal from photodetector 40, containing video signal X noise, is divided by the signal from photodetector 46, containing only noise, in a divider circuit 48, to produce an output signal which contains only the video information. Variations in the transmitted light beam due to perturbations in the atmosphere and also due to intensity variations in the output beam of the laser have been removed by a simple division operation. Furthermore, division is accomplished with narrow band equipment since the noise signals are below 100 kilocycles, and the bandwidth of divider 48 need only be sufficient to transmit signals below 100 kilocycles.

A particularly simple and effective divider circuit for use with the present invention is shown in FIG. 2, and consists of a transistor 50, operated in saturation and having an input current $I_B$ applied via resistor R1 to its base and a second input current $I_C$ applied via resistor R2 to its collector, the emitter being grounded. This divider is the subject of, and is described in detail in, copending application S.N. 453,402, filed May 5, 1965. In brief, the output voltage of this circuit, which is the collector-emitter voltage of saturated transistor 50, is approximately equal to the quotient of collector current and base current. In the instant system, the signal current from detector 40 is applied to terminal 52, while the signal current from detector 46 is applied to terminal 54. The output signal $e_{out}$, which is the quotient of the input currents, is therefore, the video signal alone, the noise having been canceled by the division operation.

From the foregoing, it is evident that a laser communications system has been provided wherein atmospheric and laser noise is eliminated by a simple, narrow band division operation, and which also provides space diversity to reduce the effects of bodies blocking the light beam. Various modifications and implementations of the present invention will occur to those versed in the art without departing from the true spirit and scope of the invention. For example, it should be evident that the instant technique is also useful to cancel noise in a microwave system. Accordingly, the invention is not to be limited by what has been particularly shown and described, except as indicated in the appended claims.

What is claimed is:

1. A laser communications system operative to cancel atmospheric and laser noise which amplitude modulates the light beam, said system comprising, a laser, a polarization light modulator operative to impress video signals onto the laser beam, means for splitting the modulated beam into two converging paths, means for receiving said modulated light, means for splitting said received light into first and second portions, first detector means operative in response to said first portion to produce a first signal containing said video signals amplitude modulated by noise, second detector means operative in response to said second portion to produce a second signal containing only noise, and a divider for dividing said first and second signals to produce an output signal containing only said video signals.

2. A system according to claim 1 wherein said first detector means includes a linear polarizer, a quarter wave plate and a photodetector, and said second detector means includes a photodetector.

3. A system according to claim 1 wherein said divider is a transistor stage operated in saturation.

4. A laser communications system operative to cancel atmospheric and laser noise which amplitude modulates the light beam, said system comprising, a laser, a light polarization modulator operative to impress information signals onto the laser beam, means for splitting the modulated beam into two paths which converge in the transmission path before interception by a receiver, said receiver including an optical filter having a bandwidth sufficient to pass received information signals, means for splitting the received light into first and second portions, a linear polarizer operative in response to said first portion to produce linearly polarized light whose intensity varies according to said information signals, a first detector operative in response to said linearly polarized light to produce a first signal containing information multiplied by noise, a second detector operative in response to said second light portion to produce a second signal containing only said noise, and a narrow band divider circuit operative to divide said first signal by said second signal to produce an output signal containing only said information.

5. A laser communications system operative to cancel atmospheric and laser noise which amplitude modulates the light beam, said system comprising, a laser, a light polarization modulator operative to impress information signals onto the laser beam, a receiver in light receiving relationship with said laser and including an optical filter having a bandwidth sufficient to pass received information signals, means for splitting the received light into first and second beams, a linear polarizer in optical alignment with said first beam and operative in response thereto to produce linearly polarized light whose intensity varies according to said information signals, a first photodetector operative in response to said linearly polarized light to produce a first electrical signal containing information multiplied by noise, a second photodetector operative in response to said second light beam to produce a second electrical signal containing only said noise, and a narrow band divider circuit operative to divide said first signal by said second signal to produce an output signal containing only said information.

References Cited

UNITED STATES PATENTS 3,351,761 11/1967 Hamby ------------ 250—199

ROBERT L. GRIFFIN, Primary Examiner

A. J. MAYER, Assistant Examiner 325-56